United States Patent

Jacobsen et al.

[11] Patent Number: 5,877,887
[45] Date of Patent: Mar. 2, 1999

[54] LIGHT BEAM DEFLECTION MEANS

[75] Inventors: Thomas Jacobsen, Kiel; Bernd Joachim Lemke, Bad Segeberg, both of Germany

[73] Assignee: Linotype-Hell AG, Kiel, Germany

[21] Appl. No.: 750,893

[22] PCT Filed: Apr. 24, 1996

[86] PCT No.: PCT/DE96/00708
§ 371 Date: Dec. 19, 1996
§ 102(e) Date: Dec. 19, 1996

[87] PCT Pub. No.: WO96/35211
PCT Pub. Date: Nov. 7, 1996

[30] Foreign Application Priority Data

Apr. 29, 1995 [DE] Germany .................. 195 15 887.3

[51] Int. Cl.⁶ ..................................... G02B 76/08
[52] U.S. Cl. ..................... 359/220; 359/198; 359/209; 359/212
[58] Field of Search ..................... 359/196, 197, 359/198, 212, 214, 215, 220; 347/257, 258, 259

[56] References Cited

U.S. PATENT DOCUMENTS

| | | | |
|---|---|---|---|
| 3,622,222 | 11/1971 | Remy et al. | 359/220 |
| 4,560,244 | 12/1985 | Ackerman | 359/220 |
| 5,083,138 | 1/1992 | Nowak et al. | 347/259 |
| 5,274,491 | 12/1993 | Collins, Jr. et al. | 359/200 |
| 5,592,324 | 1/1997 | Inagaki et al. | 359/212 |

FOREIGN PATENT DOCUMENTS 0 450 901 A2  10/1991  European Pat. Off. .
0 475 399 A2  3/1992  European Pat. Off. .

*Primary Examiner*—Cassandra C. Spyrou
*Assistant Examiner*—Darren E. Schuberg
*Attorney, Agent, or Firm*—Hill & Simpson

[57] ABSTRACT

A light beam deflection unit for deflecting a light beam has a carrier seated in rotatable fashion around an optical axis, a reflector arranged at the rotatable carrier, and a reflection face oriented transversely relative to the optical axis. The carrier is connected to a sleeve that laterally surrounds the reflector at least in certain regions, and that rotates with the carrier. The sleeve has a light entry aperture for the incident light beam at an end face facing away from the reflector, and a light exit aperture for the deflected light beam in the generated surface. An achromatic lens that is displaceable in the direction of the optical axis for the purpose of focussing the light beam and that is held by the sleeve is located in the light entry aperture. A wedge-shaped, transparent insert is arranged in the light exit aperture for astigmatism correction.

18 Claims, 2 Drawing Sheets

LIGHT BEAM DEFLECTION MEANS

BACKGROUND OF THE INVENTION

The invention is in the field of electronic reproduction technology and is directed to a light beam deflection unit in a scanner device for an originals scanning apparatus or recording apparatus. Such a scanner device essentially comprises a light source, for example a laser light source, that generates a light beam that is periodically deflected across a subject with the rotating light beam deflection unit.

In an originals scanning apparatus, also referred to as input scanner, a light beam generated in a scanner device is conducted pixel-by-pixel and line-by-line over an original to be scanned, and the scan light the original reflects or allows to pass is converted into an image signal by an optoelectronic transducer. In a recording apparatus, also referred to as a recorder, exposer or output scanner, the light beam acquired in a scanner device is modulated in intensity by an image signal for recording information and is conducted pixel-by-pixel and line-by-line across a light-sensitive recording material.

In the case of a flat bed scanner, the holder for the original or, the recording material is a plane surface over which the light beam is conducted pixel-by-pixel and line-by-line, and which moves relative to the scanner device. In the case of an inside drum apparatus, the holder for the original or, for the recording medium is designed as a stationary half-shell or trough. The scanner device moves parallel to the longitudinal axis of the holder, and the light beam is radially conducted over the original or, the recording material perpendicular to the longitudinal axis.

An inside drum apparatus is disclosed, for example, by EP-A-0 354 028. The light beam deflection unit therein is designed as a reflective surface arranged transversely relative to the direction of light propagation and is connected to a rotating shaft. The light beam is conducted onto a recording material with the assistance of the reflective surface.

Contaminants can collect at the reflective surface during operation of the recording apparatus, and air turbulence can arise at high speeds due to the asymmetrical design with respect to the axis of rotation. This air turbulence leads to noise loads, causes additional dirt in the region of the reflective surface and deteriorates the uniform rotation of the reflective surface.

DE-A41 24 229 already discloses a light beam deflection means with a light entry face and a light exit face for the perpendicularly deflected light beam that is composed of a rotationally seated carrier prism and of a light-transmissive deflection prism that extends in the direction of its rotational axis. The surface of the deflection prism adjoining the carrier prism is designed as a reflection face that proceeds transversely relative to the rotational axis. The deflection prism is glued to the carrier prism, and the two prisms supplement each other at least in regions to form a unit that is symmetrical relative to the rotational axis. Disk-shaped cover elements that project beyond the unit in radial expanse are arranged to the side of the unit.

Only slight air turbulence, contamination and unquiet running in fact occur in this light beam deflection unit due to the cover elements; the manufacture thereof, however, is comparatively complicated since the cover elements must be precisely manufactured and precisely centered at the unit.

DE-A41 30 977 discloses another light beam deflection unit that is composed of a transparent body designed as a spherical segment that has a light entry face, a reflection face, and a light exit face, and is further composed of a carrier member likewise designed as a spherical segment that is glued to the transparent body at the reflection face. The unit formed of the transparent body and of carrier member is rotatable around an axis residing vertically relative to the light entry face and has an outside contour that is rotational-symmetrical at least with reference to the axis. As a result of the spherical designing of the light beam deflection unit, this can rotate at a relatively high speed without creating significant air turbulence and bearing noise.

The known light beam deflection units have proven themselves well up to now. However, light sources, preferably laser light sources, with higher luminous power are required for exposing certain recording materials. In practice, the required luminous powers can currently only be generated by light sources that generate light with a greater wavelength of, for example, 1064 nm. In order to deflect a light beam having a greater wavelength, the light beam deflection units must have a correspondingly large entry aperture in order to obtain comparable pixel sizes and line widths in the exposure, despite the greater wavelength.

The enlargement of the entry aperture in a light beam deflection unit, however, results in an increase in the running noises and in unquiet running. A further disadvantage is that the air turbulences contaminate the reflective surfaces of the light beam deflection unit, this leading to optical losses and, thus, poorer reproduction quality.

SUMMARY OF THE INVENTION

It is therefore an object of the present invention to design a focussing light beam deflection unit such that is has a large entry aperture, and air turbulences and unquiet running are reduced and contamination of the reflective surfaces is prevented.

According to the invention, a light beam deflection unit is provided having a carrier seated in rotatable fashion around an optical axis. A reflector is arranged on the rotating carrier and has a reflection face oriented transversely relative to the optical axis. A sleeve is connected to the carrier and which laterally at least partially surrounds the deflector. The sleeve has a light entry aperture for an incident light beam at an end facing away from the reflector and a light exit aperture for a light beam deflected by the reflector in a generated surface of the sleeve. At least one lens is held by the sleeve at the light entry aperture for focusing the light beam. The transparent insert is provided in the light exit aperture.

The invention is explained in greater detail below with reference to FIGS. 1 and 2.

DESCRIPTION OF THE PREFERRED EMBODIMENTS

Figure 1:
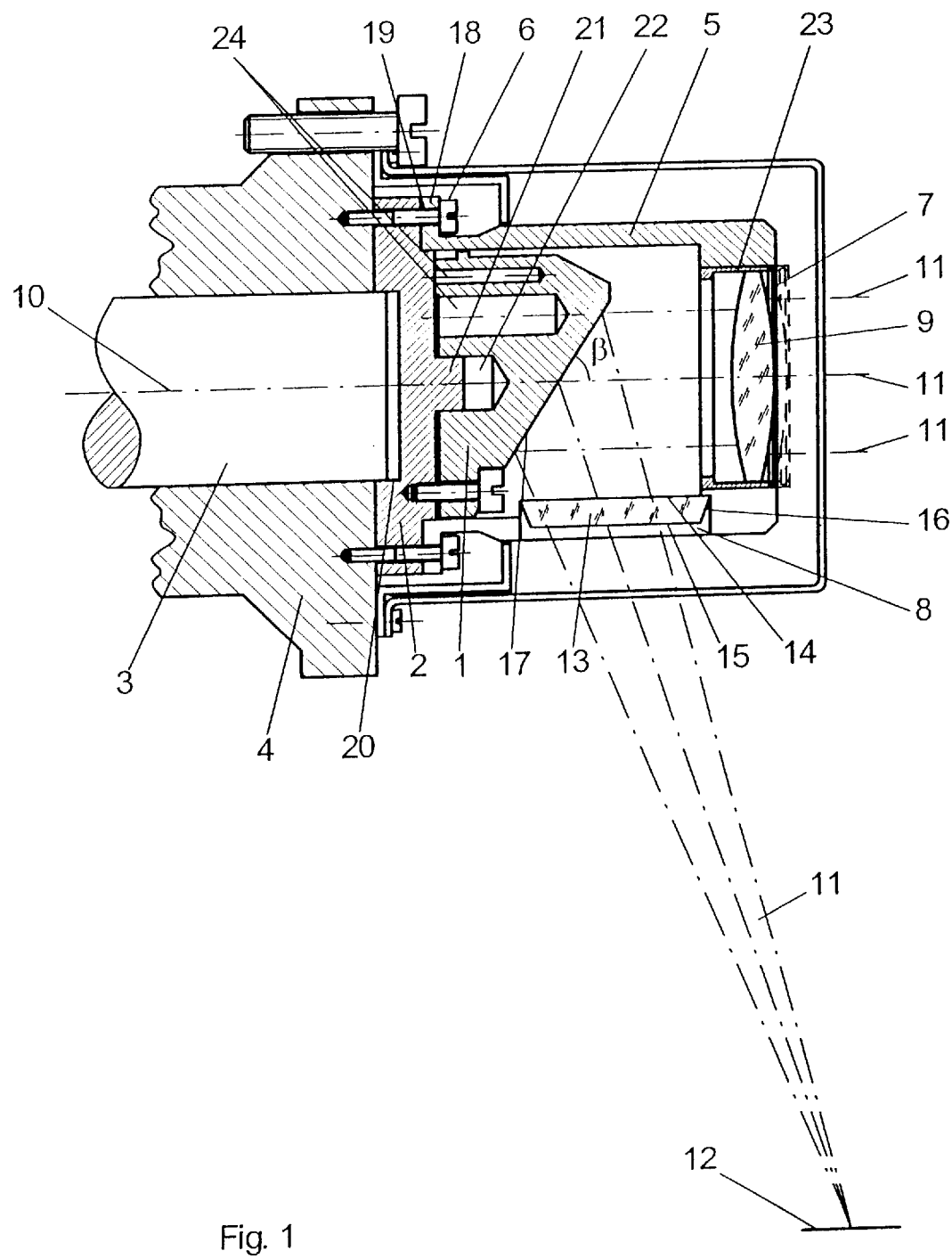
FIG. 1 is a longitudinal section through the light deflection means.

FIG. 1 shows a longitudinal section through the light beam deflection unit of the invention. A reflector 1 is connected to a carrier 2 that is coupled to a rotatable shaft 3. The shaft 3 is guided in a mount 4. The reflector 1 is arranged inside a housing designed as a dynamically balanced sleeve 5 that is connected to the carrier 2. The connection can occur via screws 6. The hollow-cylindrical sleeve 5 comprises a light entry aperture 7 at the end face facing away from the reflector 1 and comprises a light exit aperture 8 in the generated surface.

At least one lens, preferably an achromatic lens 9, that is symmetrically arranged relative to an optical axis 10, is located in the light entry aperture 7. The optical axis 10 simultaneously forms the rotational axis for the light beam deflection unit.

The achromatic lens 9 is displaceable in the direction of the optical axis 10 for the purpose of adjustment and can be fixed in the ultimate position in the sleeve 5 after the adjustment, for example by gluing. The adjustment occurs such that a reflected light beam 11 is focussed onto a subject plane 12.

The light exit aperture 8 is closed by a transparent insert 13 that comprises a planar inner light passage face 14 and a planar outer light passage face 15. The light passage faces 14; 15 are preferably aligned in wedge-like fashion relative to one another, whereby the outer light passage face 15 is oriented parallel to the optical axis 10 or, parallel to the surface line of the sleeve 5. The angle between the light passage faces 14; 15 aligned in wedge-like fashion relative to one another can vary dependent on the respective reflection angle of the light beam 11. The wedge-shaped, transparent insert 13 is glued into the light exit aperture 8. An astigmatism correction can be advantageously implemented with the wedge-shaped insert 13.

In order to enhance the stability of the device and for the best possible approximation of the insert 13 to the outside contour of the sleeve 5, the outside limitation of the insert 13 preferably has slanting sides 16, so that the crossectional area of the insert 12 is essentially designed trapezoidal in both expanses.

The reflector 1 has a reflection face 17 or mirror face oriented at a slant relative to the optical axis 10. The reflector 1 is composed of, for example, polished aluminum, and the reflection face 17 comprises, for example, a gold coat. The angle of inclination $\beta$ of the reflection face 17 relative to the optical axis 1 can, for example, lie in the range from 45° through 70°. In the illustrated exemplary embodiment, for example, the angle of inclination $\beta$ amounts to 65°. A resistant embodiment of the reflector 1 is achieved in that the reflector 1 comprises an essentially cylindrical basic shape, and the reflection face 17 is designed as an obliquely arranged cylindrical section.

The light beam 11 generated in a stationary light source not shown is incident through the light entry aperture 7 and the achromatic lens 9 10 onto the reflection face 17 of the reflector 1. The light beam 11 deflected by the reflection face 17 proceeds through the light exit aperture 8 onto the subject plane 12, on which a recording material to be exposed is fixed in that case when the light beam deflection unit is employed in an exposer.

As a result of arranging the reflector 1 in a sleeve-shaped housing, a compact light beam deflection unit that has an essentially dynamically balanced outside contour advantageously arises. As a result of the light entry aperture 7 being closed by the achromatic lens 9 and the light exit aperture 8 being closed by the transparent insert 13, an encapsulated interior that prevents a contamination of the reflection face 17 of the reflector 1 preferably arises.

The sleeve 5 is provided with an all around flange 18 in which bores 19 are arranged for the passage of the screws 6. Outside threads of the screws 6 engage into the inside thread of the carrier 2. The carrier 2 accepts an end piece of the shaft 3 in a recess 20. For centering the reflector 1, the carrier 2 has a centering peg 21 that is introduced into a centering bore 22 of the reflector 1. The centering bore 22 and the centering peg 21 extend symmetrically relative to the optical axis 10.

The achromatic lens 9 is held by an insert 23 that is displaceable in the direction of the optical axis 10 relative to the sleeve 5 for the purpose of focussing the light beam 11.

The reflector 1 has weight compensation bores 24 in order to achieve a symmetrical distribution of the material relative to the optical axis 10 and to simultaneously achieve a reduction in weight. The weight compensation bores 24 extend from the carrier 2 of the reflector 1 in the direction toward the reflection face 17 without, however, penetrating the latter.

A balancing given high mechanical stability at the same time can be achieved in that three weight compensation bores 24 are provided. An effective arrangement of the weight compensation bores 24 is produced in that they extend along the outside circumference of the reflector 1. A space-saving arrangement is achieved by weight compensation bores 24 arranged adjacent to one another.

The employment of the light beam deflection unit of the invention makes it possible to utilize an enlarged entry aperture corresponding to the greater wavelength and to generate comparable line widths and pixel or, dot sizes despite the greater wavelength. The light beam deflection unit can also be fundamentally employed for the deflection of light beams with a shorter wavelength, whereby an improvement in quiet running and a reduction in the tendency to become contaminated are likewise achieved compared to the prior art. Over and above this, the light beam deflection unit has the advantage that it is modularly constructed, as a result unit each structural module can be individually balanced with respect to the rotational axis and, thus, fabrication can be simplified.

Figure 2:
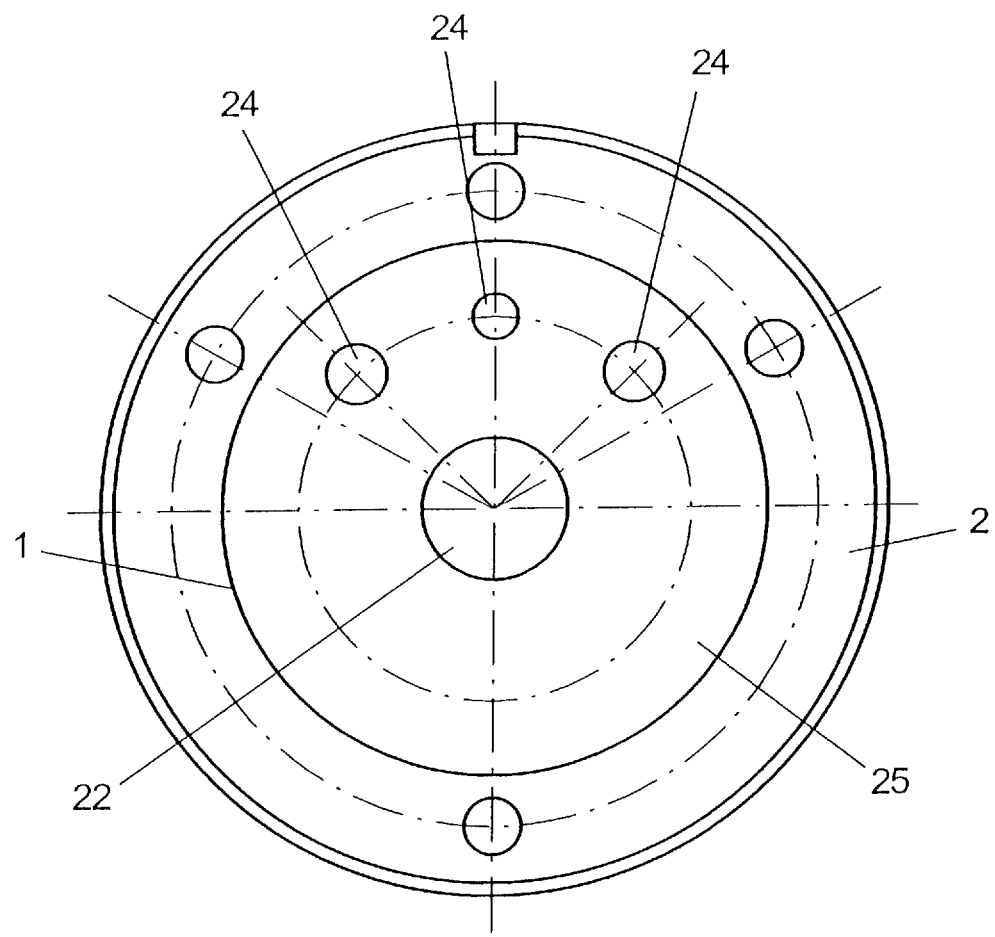
FIG. 2 is an plan view onto the reflector.

In a view onto the reflector 1, FIG. 2 shows the position of the weight compensation bores 24 relative to the centering bore 22. Three weight compensation bores 24 are provided, these extending on a circle around the centering bore 22. Connecting lines of the mid-point of the centering bore 22 with the mid-points of the weight compensation bores 24 lying at the outside erect an angle of 90°. The positioning of the weight compensation bores 24 is selected such that both a high stability as well as a symmetrical weight distribution relative to the optical axis 10 as a rotational axis are achieved. The reflector 1 is mounted on the carrier 2 over which a cylindrical section 25 with the reflection face 17 (not visible) rises.

Although various minor changes and modifications might be proposed by those skilled in the art, it will be understood that our wish is to include within the claims of the patent warranted hereon all such changes and modifications as reasonably come within our contribution to the art.

We claim as our invention:

1. A light beam deflection unit, comprising:

a carrier seated in rotatable fashion around an optical axis;

a reflector arranged on the rotating carrier and having a reflection face oriented transversely relative to the optical axis;

a hollow sleeve connected to rotate with the carrier and which laterally at least partially surrounds the reflector, and which has a light entry aperture at an open end of the sleeve for an incident light beam at an end facing away from the reflector and a light exit aperture in a generated surface sidewall of the sleeve for a light beam deflected by the reflector; light beam; and at least one lens held by the sleeve at the light entry aperture for focussing the a transparent insert in the light exit aperture.

2. A unit according to claim 1 wherein the lens comprises an achromatic lens.

3. A unit according to claim 2 wherein the achromatic lens is held in an insert that is displaceable within the sleeve in a direction of the optical axis.

4. A unit according to claim 2 wherein the achromatic lens is retained to the sleeve by glue radially of the achromatic lens.

5. A unit according to claim 1 wherein the reflector comprises a substantially cylindrical basic shape, and the reflection face comprises an obliquely arranged cylindrical section.

6. A unit according to claim 1 wherein the reflector has at least one weight compensation bore in a region of a backside facing away from the reflection face.

7. A unit according to claim 6 wherein three weight compensation bores are provided.

8. A unit according to claim 7 wherein the weight compensation bores are arranged adjacent to one another.

9. A unit according to claim 6 wherein the weight compensation bore extends along an outside circumference of the reflector.

10. A unit according to claim 1 wherein the reflection face of the reflector is arranged inclined relative to the optical axis within an angular range from 45° through 70°.

11. A unit according to claim 1 wherein outside edges of a cross-sectional area of said transparent insert form slanting sides.

12. A unit according to claim 1 wherein a cross-section of the transparent insert has a trapezoidal shape.

13. A unit according to claim 1 wherein the reflector comprises aluminum and the reflection face comprises a coat of gold thereon.

14. A unit according to claim 1 wherein the reflector is retained by glue to the carrier.

15. A unit according to claim 1 wherein the insert is retained to the sleeve by glue radially of the insert.

16. A light beam deflection unit, comprising:

a carrier seated in rotatable fashion around an optical axis;

a reflector arranged on the rotating carrier and having a reflection face oriented transversely relative to the optical axis;

a sleeve connected to the carrier and which laterally at least partially surrounds the reflector, and which has a light entry aperture for an incident light beam at an end facing away from the reflector and a light exit aperture for a light beam deflected by the reflector in a generated surface of the sleeve;

at least one lens held by the sleeve at the light entry aperture for focussing the light beam;

a transparent insert in the light exit aperture;

the transparent insert comprising a planar inner light passage face directed into an interior of the sleeve and a planar outer light passage face directed away from the interior;

the light passage faces being aligned wedge-shaped relative to one another; and the outer light passage face being aligned parallel to the optical axis.

17. A unit according to claim 16 wherein an angle of the wedge-shape is selected dependent on a reflection angle of the light beam.

18. A light beam deflection unit, comprising:

a carrier seated in rotatable fashion around an optical axis;

a reflector arranged on the rotating carrier and having a reflection face oriented transversely relative to the optical axis;

a hollow sleeve connected to rotate with the carrier at a first end and which laterally surrounds the reflector, and which has a light entry aperture for an incident light beam at a second end of said sleeve opposite said first end and a light exit aperture for a light beam deflected by the reflector in a side wall of the sleeve; and at least one lens held by the sleeve at the light entry aperture for focussing the light beam.

* * * * *